US009361123B2

(12) United States Patent
Belusar et al.

(10) Patent No.: US 9,361,123 B2
(45) Date of Patent: Jun. 7, 2016

(54) BOOT FROM LOGICAL VOLUME SPANNING PLURALITY OF PCI DEVICES

(71) Applicant: Hewlett-Packard Development Company, L.P., Fort Collins, CO (US)

(72) Inventors: Craig M Michael Belusar, Houston, TX (US); Philip K. Wong, Austin, TX (US); Matthew C. Perricone, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 347 days.

(21) Appl. No.: 13/909,759

(22) Filed: Jun. 4, 2013

(65) Prior Publication Data

US 2014/0359263 A1 Dec. 4, 2014

(51) Int. Cl.
G06F 9/445 (2006.01)
G06F 13/00 (2006.01)
G06F 9/44 (2006.01)
G06F 13/14 (2006.01)
G06F 3/06 (2006.01)
G06F 3/12 (2006.01)
G06F 13/10 (2006.01)

(52) U.S. Cl.
CPC ............ G06F 9/4408 (2013.01); *G06F 3/0635* (2013.01); *G06F 3/126* (2013.01); *G06F 9/4411* (2013.01); *G06F 13/102* (2013.01); *G06F 13/14* (2013.01)

(58) Field of Classification Search
CPC ... G06F 3/0635; G06F 9/4411; G06F 13/102; G06F 13/14
USPC .................................................... 713/1, 2, 100
See application file for complete search history.

(56) References Cited

U.S. PATENT DOCUMENTS

| 6,529,989 | B1 | 3/2003 | Bashford et al. |
| 6,651,165 | B1 | 11/2003 | Johnson |
| 6,721,883 | B1 | 4/2004 | Khatri et al. |
| 7,734,868 | B2 | 6/2010 | Zhu |
| 8,214,541 | B2 | 7/2012 | Bolen et al. |
| 8,291,208 | B2 | 10/2012 | Thompson |
| 8,954,670 | B1 * | 2/2015 | Subramanian et al. ....... 711/114 |

OTHER PUBLICATIONS

O'Gara, M. et al., NVIDIA nForce(TM)4 SLI(TM) Redefines Digital Media Experience on Intel-Based PCs, (Research Paper), 7 pps., http://coldfusion.sys-con.com/node/49859.

* cited by examiner

*Primary Examiner* — Michael J Brown
(74) *Attorney, Agent, or Firm* — Hewlett Packard Enterprise Patent Department

(57) ABSTRACT

A first driver may interface with an operating system (OS). A second driver may interface with a plurality of Peripheral Component Interconnect (PCI) devices. The first driver may expose the plurality of PCI devices as a single logical volume to the OS. The OS may boot from the single logical volume that spans the plurality of PCI devices.

15 Claims, 3 Drawing Sheets

BOOT FROM LOGICAL VOLUME SPANNING PLURALITY OF PCI DEVICES

BACKGROUND

Peripheral Component Interconnect (PCI) devices may connect to a main device, such as a server, and provide various types of additional functionality for the main device. Example PCI devices may include controllers, storage devices, network cards and the like. Manufacturers and/or vendors are challenged to continue providing even more functionality to the main device through PCI devices.

BRIEF DESCRIPTION OF THE DRAWINGS

The following detailed description references the drawings, wherein.

DETAILED DESCRIPTION

Specific details are given in the following description to provide an understanding of examples of the present techniques. However, it will be understood that examples of the present techniques may be practiced without these specific details. For example, systems may be shown in block diagrams in order not to obscure examples of the present techniques in unnecessary detail. In other instances, well-known processes, structures and techniques may be shown without unnecessary detail in order to avoid obscuring the examples of the present techniques.

A Redundant array of independent (or inexpensive) disks (RAID) may refer to a category of disk drives that employ two or more drives in combination for fault tolerance and performance. The RAID may allow for data to be stored redundantly and/or in multiple paces in a balanced way to improve overall storage performance. The RAID may also include parity information such as Error-Correcting Coding (ECC).

Recently, new types of Peripheral Component Interconnect (PCI) devices have emerged, such as PCI Express (PCIe) attached solid state drives (SSDs) and chipset Serial Advanced Technology Attachment (SATA) ports spanning multiple PCIe devices. RAID architectures are being developed using PCI devices. Conventionally, a computing device may only boot from a single PCI device. Thus, bootable RAID functionality may also be tied to a single PCIe device.

Examples of present techniques may allow a user to booting from a single RAID volume that spans multiple PCI devices. An example device may include a first driver unit and a second driver unit. The first driver unit may interface with an operating system (OS). The second driver unit may interface with the first driver unit and with a plurality of Peripheral Component Interconnect (PCI) devices. The first driver unit may communicate with the second driver unit to expose the plurality of PCI devices as a single logical volume to the OS. The OS may boot from the logical volume spanning the plurality of PCI devices. Thus, examples of present techniques may provide a bootable logical volume that spans across multiple PCI devices, unlike conventional RAID solutions.

Figure 1:
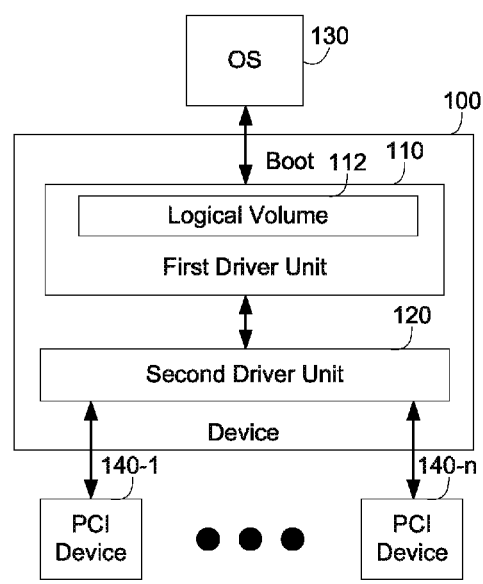
FIG. 1 is an example block diagram of a device to expose a plurality of PCI devices as a single logical volume to an OS.

Referring now to the drawings, FIG. 1 is an example block diagram of a device 100 to expose a plurality of Peripheral Component Interconnect (PCI) devices 140-1 to 140-n as a single logical volume 112 to an operating system (OS) 130. The device 100 may couple to or be included in any type of computing device or controller that interfaces with a PCI device, such as a secure microprocessor, a storage device controller, a notebook computer, a desktop computer, an all-in-one system, a server, a network device, a wireless device and the like.

In the example of FIG. 1, device 100 interfaces with the plurality of PCI devices 140-1 to 140-n and the OS 130. Further, the device 100 includes a first driver unit 110 and a second driver unit 120. The first and second driver units 110 and 120 may include, for example, a hardware device including electronic circuitry for implementing the functionality described below, such as control logic and/or memory. In addition or as an alternative, the first and second driver units 110 and 120 may be implemented as a series of instructions encoded on a machine-readable storage medium and executable by a processor.

The first driver unit 110 may interface with the OS 130. Examples of the OS 130 may include Android, BSD, iOS, GNU/Linux, OS X, QNX, Microsoft Windows, Windows Phone, IBM z/OS and the like. The second driver unit 120 may interface with the first driver unit 110 and with the plurality of PCI devices 140-1 to 140-n.

PCI may refer to specification or a local computer bus for attaching hardware devices to a computing device, such as the device 100. The PCI bus may supports functions found on a processor bus, but in a standardized format that is independent of any particular processor. Devices connected to the PCI bus may appear to a processor of the computing device to be connected directly to the processor bus, and are assigned addresses in the processor's address space. The term PCI may include any variations of PCI, such as PCI Express (PCIe), Compact PCI, Mini PCI, Low-Profile PCI, concurrent PCI, PCI-X and the like. Examples of PCI devices may include controllers, storage devices like hard disk drives (HDDs) or solid state drives (SDDs), network cards, sound cards, modems and the like.

The first driver unit 110 may communicate with the second driver unit 120 to expose the plurality of PCI devices 140-1 to 140-n as a single logical volume 112 to the OS 130. The logical volume 112 may refer to a type of storage virtualization where a plurality of physical volumes are mapped to a single, continuous volume. For example, the physical volumes may be concatenated, striped together or otherwise combined into one or more logical volumes that an administrator may re-size or move, without interrupting the OS 130.

Further, to the OS 130, the logical volume 12 may appear as a single physical drive. As a result, the OS 130 may boot from the logical volume 112 spanning the plurality of PCI devices 140-1 to 140-n. For example, the OS 130 may boot simultaneously from more than one of the PCI devices 140-1 to 140-n through the logical volume 112. The term booting may refer to initial set of operations that a computing device, such as a device including the OS 130, performs when electrical power to the computing device's processor is switched on. Moreover, the OS 130 does not include a software stack for the plurality of PCI devices 140-1 to 140-n and the plurality of PCI devices 140-1 to 140-n are removable from the device 100 without disrupting the OS 130. This is because the first driver unit 120 may not be removable from the device 100 and may store the software stack of the PCI devices 140-1 to 140-n, thus allowing hot plugging.

Figure 2:
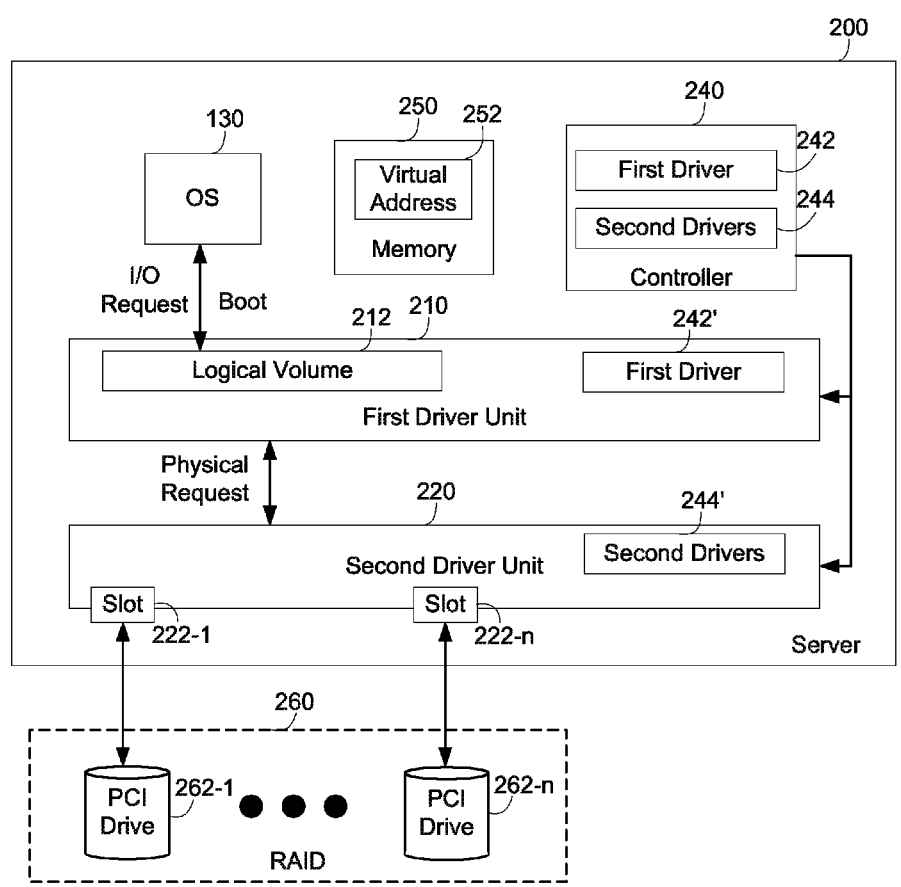
FIG. 2 is another example block diagram of a device to expose a plurality of PCI devices as a single logical volume to an OS.

FIG. 2 is another example block diagram of a device 200 to expose a plurality of PCI devices 262-1 to 262-n as a single logical volume 212 to an OS 130. The device 200 may couple to or be included in any type of computing device or controller that interfaces with a storage device, such as a secure microprocessor, a storage device controller, a notebook computer, a desktop computer, an all-in-one system, a server, a network device, a wireless device and the like.

The device 200 of FIG. 2 may include at least the functionality and/or hardware of the device 100 of FIG. 1. For example, the device 200 of FIG. 2 includes a first driver unit 210 and a second driver unit 220, where the first and second driver units 210 and 220 of FIG. 2 respectively include the functionality and/or hardware of the first and second driver units 110 and 120 of FIG. 1. The device 200 further includes a controller 240, a memory 250 and the OS 130. Similar to FIG. 1, the device 200 also interfaces with the plurality of PCI devices 262-1 to 262-n. However, here the device 200 is shown to be a server and the plurality of PCI devices 262-1 to 262-n are shown to be storage devices, such as drives, included in a redundant array of independent disks (RAID) 260.

The term RAID may refer to a storage technology that combines multiple disk drive components into a logical unit. Data is distributed across the drives in one of several ways may be called "RAID levels," depending on the level of redundancy and performance required. Here, the RAID 260 is shown to include a plurality of drives 262_1 to 262_n, where n is a natural number. The term drive may refer to any category of storage mechanisms where data are recorded by various electronic, magnetic, optical, or mechanical changes to a surface layer of one or more rotating disks.

The controller 240 may include, for example, a hardware device including electronic circuitry for implementing the functionality described below, such as control logic and/or memory. In addition or as an alternative, the controller 240 may be implemented as a series of instructions encoded on a machine-readable storage medium and executable by a processor. The memory 250 may be any electronic, magnetic, optical, or other physical storage device, such as a Random Access Memory (RAM) or storage drive.

The first driver 210 includes a first driver 242' that does not directly control any of the plurality of PCI devices 262-1 to 262-n. The second driver 220 includes a plurality of second drivers 244'. Each of the second drivers 244' may directly control one of the plurality of PCI devices 262-1 to 262-n. The first driver 242' may not be tied to any specific storage device, such as the PCI devices 262-1 to 262-n.

The term driver may refer to software or firmware that operates or controls a particular type of device that is attached to a computer. A driver typically communicates with the attached device through a computer bus or communications subsystem to which the hardware connects, such as PCI. When a calling program invokes a routine in the driver, the driver issues commands to the attached device.

For example, the first driver 242' may be a RAID stack driver and the plurality of second drivers 244' may be component device drivers. In one instance, the OS 130 may submit an Input/Output (I/O) request to the RAID stack driver 242' of the first driver unit 210. The RAID stack driver 242' may the convert the I/O request to a physical request and forward the physical request along a communication path to the second driver unit 220. For example, the RAID stack driver 242' may include a RAID mapper portion (not shown) which breaks the I/O request in to physical requests. The physical request may be directed to one or more of the plurality of component device drivers 244'. The one or more of the plurality of component device drivers 244' may communicate with the RAID stack driver 242' via the communication path in response to the physical request.

In one instance, the RAID stack driver 242' and the component device drivers 244' may not have respectively been included in the first and second driver units 210 and 220. Instead, the controller 240 may have initially loaded the RAID stack driver (or first driver) 242 over a generic PCI driver at the first driver unit 210 and loaded the component device drivers (or second drivers) 244 over generic device drivers at the second driver unit 220. The original generic PCI driver would have likely lacked functionality and simply presented a PCI device 262 as an unknown device to the OS 130. The original component device drivers would have had exposed the PCI devices 262-1 to 262-2 directly to the OS 130 (instead of the first driver unit 210), thus negating an ability of the OS 130 do boot off of multiple PCI devices 262.

While the controller 240 is shown to be a separate entity in FIG. 2, the controller may 240 may be a part of at least one of a boot image, a Basic Input/Output System (BIOS) (not shown) of the server 200, a Unified Extensible Firmware Interface (UEFI) (not shown) and the OS 130. For example, part of the controller 240 may be present and active in the UEFI during a pre-boot environment before the OS 130 is loaded while an other part of the controller 240 may be active in the OS 130 during a runtime. These separate parts of the controller 240 may be different or duplicative in function and/or implementation. The term UEFI may refer to a specification that defines a software interface between an OS and platform firmware.

The controller 240 may store virtual addresses 252 corresponding to base address registers (BARs) of the plurality of PCI devices 262-1 to 262-n to the memory 250 of the device 200. The OS 130 may access the virtual addresses 252 in response to at least one of a crash dump and hibernation, thus allowing for a faster recovery time by shortening a reboot time.

The controller 240 and/or the first driver unit 210 may communicate via a Small Computer System Interface (SCSI) layer. Thus, the first driver unit 210 may provide bootable RAID functionality across the plurality of PCI devices 262-1 to 262-n connected to the server 200. The OS 130 is to boot from a plurality of slots 221-1 to 222-n of a PCI of the server 200, where the plurality of PCI devices 262-1 to 262-n connect to the server 200 via the slots 221-1 to 222-n.

Figure 3:
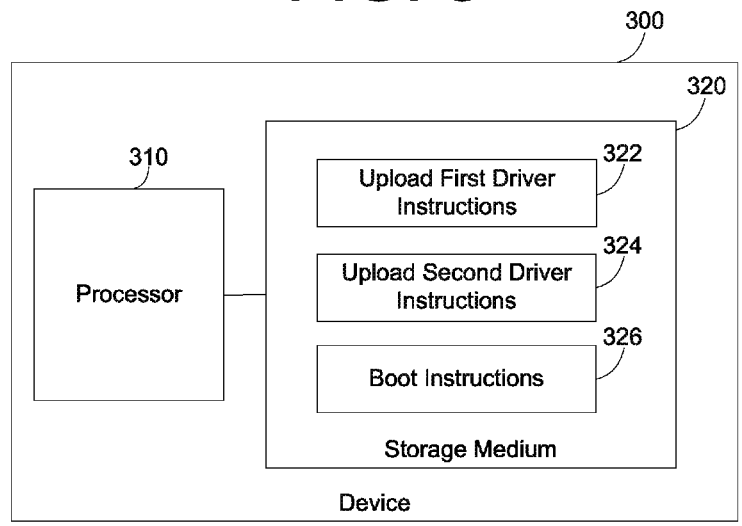
FIG. 3 is an example block diagram of a computing device including instructions for booting from a single logical volume exposed to an OS.

FIG. 3 is an example block diagram of a computing device 300 including instructions for booting from a single logical volume exposed to an OS. In FIG. 3, the computing device 300 includes a processor 310 and a machine-readable storage medium 320. The machine-readable storage medium 320 further includes instructions 322, 324 and 326 for booting from a single logical volume exposed to an OS.

The computing device 300 may be, for example, a controller, a secure microprocessor, a notebook computer, a desktop computer, an all-in-one system, a server, a network device, a wireless device, or any other type of user device capable of executing the instructions 322, 324 and 326. In certain examples, the computing device 300 may include or be connected to additional components such as memories, sensors, displays, etc.

The processor 310 may be, at least one central processing unit (CPU), at least one semiconductor-based microprocessor, other hardware devices suitable for retrieval and execution of instructions stored in the machine-readable storage medium 320, or combinations thereof. The processor 310 may fetch, decode, and execute instructions 322, 324 and 326 to implement booting from the single logical volume exposed to the OS. As an alternative or in addition to retrieving and executing instructions, the processor 310 may include at least one integrated circuit (IC), other control logic, other electronic circuits, or combinations thereof that include a number of electronic components for performing the functionality of instructions 322, 324 and 326.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for booting from the single logical volume exposed to the OS.

Figure 4:
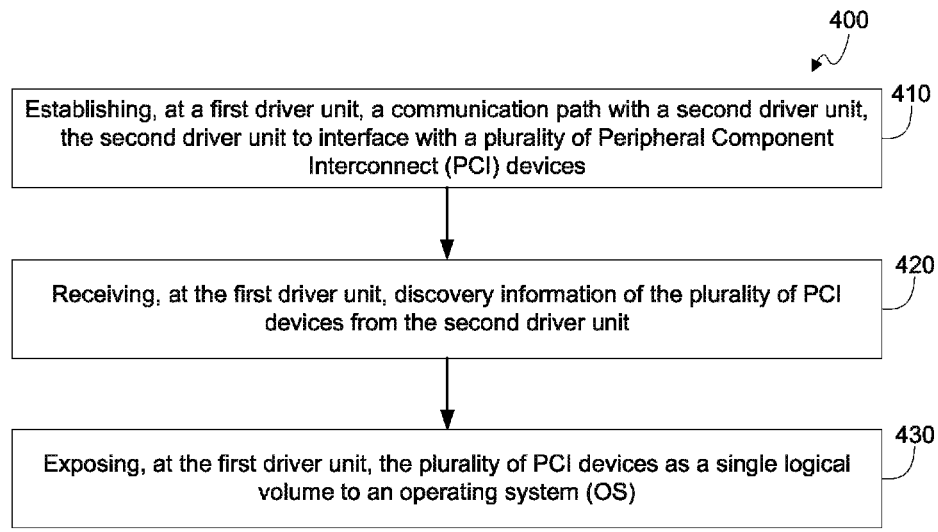
FIG. 4 is an example flowchart of a method for exposing a plurality of PCI devices as a single logical volume to an OS.

Moreover, the instructions 322, 324 and 326 when executed by a processor (e.g., via one processing element or multiple processing elements of the processor) can cause the processor to perform processes, such as, the process of FIG. 4. For example, the upload first driver instructions 322 may be executed by the processor 310 to upload a first driver to a first driver unit (not shown). The first driver may interface with an OS (not shown). The upload second driver instructions 324 may be executed by the processor 310 to upload a second driver to a second driver unit (not shown). The second driver may interface with a plurality of PCI devices (not shown).

The boot instructions 324 may be executed by the processor 310 to boot from a single logical volume (not shown) exposed to the OS by the first driver. The first driver may establish a communication path with the second driver to create the single logical volume that spans the plurality of PCI devices. The machine-readable storage medium 320 may further include instructions not shown. For example, instructions may be executed by the processor 310 to transmit an I/O request (not shown) from the OS to the first driver. The first driver may communicate with the plurality of PCI devices via the second driver to complete the I/O request.

FIG. 4 is an example flowchart of a method 400 for exposing a plurality of PCI devices as a single logical volume to an OS. Although execution of the method 400 is described below with reference to the first driver unit 210, other suitable components for execution of the method 400 can be utilized, such as the first driver unit 110. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the first driver unit 210 establishes a communication path with a second driver unit 220. The second driver unit 220 may interface with a plurality of PCI devices 262-1 to 262-n, where n is a natural number. Next, at block 420, the first driver unit 210 receives discovery information of the plurality of PCI devices 262-1 to 262-n from the second driver unit 220. Then, at block 430, the first driver unit 210 exposes the plurality of PCI devices 262-1 to 262-n as a single logical volume 212 to an OS 130.

The OS 130 may boot from the logical volume 212 spanning the plurality of PCI devices 262-1 to 262-n. The second driver unit 220 may not directly communicate with the OS 130 for an I/O request. Further, the first driver 210 unit may not directly communicate with the plurality of PCI devices 262-1 to 262-n for the I/O request. According to the foregoing, examples of present techniques provide a method and/or device that allow a user to boot from a single logical volume that spans multiple PCI devices.

We claim:

1. A device, comprising:
a first driver unit to interface with an operating system (OS); and
a second driver unit to interface with the first driver unit and with a plurality of Peripheral Component Interconnect (PCI) devices, wherein
the first driver unit is to communicate with the second driver unit to expose the plurality of PCI devices as a single logical volume to the OS, and
the OS is to boot from the logical volume spanning the plurality of PCI devices.

2. The device of claim 1, wherein,
the first driver unit includes a first driver that does not directly control any of the plurality of PCI devices, and
the second driver unit includes a plurality of second drivers, each of the second drivers directly controls one of the plurality of PCI devices.

3. The device of claim 2, wherein,
at least two of the plurality of PCI devices form part of a redundant array of independent disks (RAID) array, and
the first driver is a RAID stack driver.

4. The device of claim 3, wherein,
the OS is to submit an Input/Output (I/O) request to the RAID stack driver of the first driver unit, and
the RAID stack driver is to convert the I/O request to a physical request and to forward the physical request along a communication path to the second driver unit.

5. The device of claim 4, wherein,
the plurality of second drivers are component device drivers,
the physical request is directed to one or more of the plurality of component device drivers, and
the one or more of the plurality of component device drivers are to communicate with the RAID stack driver via the communication path in response to the physical request.

6. The device of claim 1, wherein,
the OS does not include a software stack for the plurality of PCI devices, and
the plurality of PCI devices are removable from the device without disrupting the OS.

7. The device of claim 1, further comprising:
a controller to load a redundant array of independent disks (RAID) stack driver over a generic PCI driver at the first driver unit and to load a component device driver over a generic device driver at the second driver unit.

8. The device of claim 7, wherein,
the controller is to store virtual addresses corresponding to base address registers (BARs) of the plurality of PCI devices to a memory of the device, and
the OS is to access the virtual addresses in response to at least one of a crash dump and hibernation.

9. The device of claim 7, wherein at least one of the controller and the first driver unit communicate via a Small Computer System Interface (SCSI) layer.

10. The device of claim 1, wherein,
the device is a server and the first driver unit is not removable from the server, and the plurality of PCI devices are at least one of controllers and storage devices.

11. The device of claim 10, wherein
the first driver unit is to provide bootable RAID functionality across the plurality of PCI devices connected to the server, and
the OS is to boot from a plurality of slots of a PCI of the server.

12. A method, comprising:
establishing, at a first driver unit, a communication path with a second driver unit, the second driver unit to interface with a plurality of Peripheral Component Interconnect (PCI) devices;
receiving, at the first driver unit, discovery information of the plurality of PCI devices from the second driver unit; and
exposing, at the first driver unit, the plurality of PCI devices as a single logical volume to an operating system (OS), wherein
the OS is to boot from the logical volume spanning the plurality of PCI devices.

13. The method of claim 12, wherein,
the second driver unit does not directly communicate with the OS for an Input/Output (I/O) request, and
the first driver unit does not directly communicate with the plurality of PCI devices for the I/O request.

14. A non-transitory computer-readable storage medium storing instructions that, if executed by a processor of a device, cause the processor to:
upload a first driver to a first driver unit, the first driver to interface with an operating system (OS);
upload a second driver to a second driver unit, the second driver to interface with a plurality of Peripheral Component Interconnect (PCI) devices; and
boot from a single logical volume exposed to the OS by the first driver, wherein
the first driver is establish a communication path with the second driver to create the single logical volume that spans the plurality of PCI devices.

15. The non-transitory computer-readable storage medium of claim 14, further comprising instructions that, if executed by a processor of a device, cause the processor to:
transmit an Input/Ouput (I/O) request from the OS to the first driver, wherein
the first driver is to communicate with the plurality of PCI devices via the second driver to complete the I/O request.

* * * * *